United States Patent
Kinoshita et al.

(10) Patent No.: US 10,425,273 B2
(45) Date of Patent: Sep. 24, 2019

(54) DATA PROCESSING SYSTEM AND DATA PROCESSING METHOD

(71) Applicant: Hitachi, Ltd., Chiyoda-ku, Tokyo (JP)

(72) Inventors: Masafumi Kinoshita, Tokyo (JP); Tatsuhiko Miyata, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 220 days.

(21) Appl. No.: 15/505,966

(22) PCT Filed: Sep. 3, 2015

(86) PCT No.: PCT/JP2015/075112
§ 371 (c)(1),
(2) Date: Feb. 23, 2017

(87) PCT Pub. No.: WO2017/037924
PCT Pub. Date: Mar. 9, 2017

(65) Prior Publication Data
US 2017/0279654 A1    Sep. 28, 2017

(51) Int. Cl.
*H04L 12/00* (2006.01)
*H04L 29/06* (2006.01)
(Continued)

(52) U.S. Cl.
CPC .............. *H04L 29/06* (2013.01); *G06F 9/50* (2013.01); *G06F 9/5005* (2013.01);
(Continued)

(58) Field of Classification Search
CPC ......... G06F 9/4881; H04W 4/60; H04W 4/70; H04L 41/00; H04L 12/2424; H04L 67/14
(Continued)

(56) References Cited

U.S. PATENT DOCUMENTS 6,560,606 B1 * 5/2003 Young .................. G06F 9/4881
7,844,856 B1 * 11/2010 Ahal ................... G06F 11/1471
702/120
(Continued)

FOREIGN PATENT DOCUMENTS

CN    102025577 A  *  4/2011  .............. H04W 4/60
JP    2006-259812 A     9/2006
(Continued)

OTHER PUBLICATIONS

International Search Report (PCT/ISA/220 and PCT/ISA/210) issued in PCT Application No. PCT/JP2015/075112 dated Dec. 8, 2015 (4 pages).
(Continued)

*Primary Examiner* — Frantz Coby
(74) *Attorney, Agent, or Firm* — Crowell & Moring LLP

(57) ABSTRACT

A data processing system comprises: at least one each of a plurality of types of data processing module conducting different types of the data processing; data flows through which a series of different types of data processing is conducted on a message and a message subjected to the series of different types of data processing is sent to the destination; and a dispatcher distributes the message and a message subjected to the data processing by the data processing module to a subsequent data processing module, wherein the dispatcher conducts: detecting a specific data processing module in a specific status of being a bottleneck; determining the number of the specific data processing module to resolve the specific status by increasing the number of the specific data processing module; and setting the number of the specific data processing module to the number to resolve the specific status.

9 Claims, 10 Drawing Sheets

(51) Int. Cl.
  *G06F 15/82* (2006.01)
  *G06F 9/50* (2006.01)
  *G06F 11/34* (2006.01)
  *H04L 1/00* (2006.01)
  *H04L 12/26* (2006.01)
  *H04L 29/08* (2006.01)

(52) U.S. Cl.
  CPC .......... *G06F 11/3409* (2013.01); *G06F 15/82* (2013.01); *H04L 1/0002* (2013.01); *H04L 43/062* (2013.01); *H04L 43/0817* (2013.01); *H04L 67/101* (2013.01); *H04L 67/1008* (2013.01); *H04L 43/026* (2013.01)

(58) Field of Classification Search
  USPC .................. 707/737; 709/220, 223, 227, 226
  See application file for complete search history.

(56) References Cited

U.S. PATENT DOCUMENTS

| | | | | |
|---|---|---|---|---|
| 8,225,291 | B2* | 7/2012 | Chung | G06F 11/3419 714/38.1 |
| 8,230,447 | B2 | 7/2012 | Gilgen et al. | |
| 2002/0108059 | A1* | 8/2002 | Canion | H04L 29/06 726/13 |
| 2002/0120741 | A1* | 8/2002 | Webb | G06F 11/3093 709/225 |
| 2003/0236861 | A1* | 12/2003 | Johnson | G06F 9/547 709/219 |
| 2006/0212873 | A1 | 9/2006 | Takahisa | |
| 2007/0271381 | A1 | 11/2007 | Wholey et al. | |
| 2009/0254917 | A1 | 10/2009 | Ohtani | |
| 2015/0019553 | A1* | 1/2015 | Shaashua | H04W 4/70 707/737 |

FOREIGN PATENT DOCUMENTS

| | | |
|---|---|---|
| JP | 2009-251708 A | 10/2009 |
| JP | 2011-243089 A | 12/2011 |
| JP | 2014-29718 A | 2/2014 |
| WO | WO-2012092735 A1 * | 7/2012 .............. H04W 4/60 |

OTHER PUBLICATIONS

Japanese-language Written Opinion (PCT/ISA/237) issued in PCT Application No. PCT/JP2015/075112 dated Dec. 8, 2015 (3 pages).
"Auto Scaling Developer Guide API Version Jan. 1, 2011", Amazon Web Services, Inc., 2015 (151 pages).

* cited by examiner

| 601 | 602 | 603 | 604 | 605 | 606 | 607 | 608 |
|---|---|---|---|---|---|---|---|
| QUEUE ID | PROCESS NAME | RESOURCE REQUIREMENT | PROCESS PRIORITY | FLOW VOLUME CONTROL INFORMATION | FLOW VOLUME CURRENT VALUE | RESOURCE VALUE | PROTOCOL INFORMATION |
| 001 | A | OWN SERVER | 2 | DISTRIBUTION NUMBER 4 100msg/sec | 90msg/sec | CPU X% | REST/HTTP (PUSH, 3 REDUNDANCY) |
| 002 | B | ANOTHER SERVER (AUTOMATIC EXTENSION NOT AVAILABLE) | 1 | DISTRIBUTION NUMBER 2 50msg/sec | 50msg/sec | CPU X% | MQTT |
| 003 | C | ANOTHER SERVER (AUTOMATIC EXTENSION AVAILABLE) | 2 | DISTRIBUTION NUMBER 3 Xmsg/sec | 30msg/sec | CPU X% | |
| 004 | DISPATCHER DELIVERY 1 | - | 2 | DISTRIBUTION NUMBER 3 100msg/sec | 30msg/sec | CPU X% | |
| ... | ... | ... | ... | ... | ... | ... | ... |

432 DATA PROCESSING TABLE

Fig. 6

DATA PROCESSING SYSTEM AND DATA PROCESSING METHOD

BACKGROUND

The present invention relates to a data processing system that performs data processing, and a data processing method.

In recent years, Internet of Things (IoT)/Machine to Machine (M2M) has becoming more common in the social infrastructure services such as communications, electrical power, transportation and industry. A server system that provides the IoT services (will be referred to as an IoT service system below) collects data transmitted from various communication devices such as mobile phones, smart meters, automobiles, and factory equipment (will be referred to as a message below), and processes the message in accordance with the designated service.

The IoT service system is required to have frequent system changes due to an update or change to the usage purpose of the message. This requires an operator to redo the load distribution design and perform multiple load tests to determine the parameters for load distribution (will be referred to as tuning below). Businesses are facing the challenge of reducing the cost and time required for the load distribution design and tuning. In the load distribution design and turning, the operator repeatedly performs a load test with respect to the resource, bottleneck analysis, resource assignment, and parameter settings. By doing so, the operator finds the parameter value and distribution design that maximize the processing performance of the system (through-put).

In order to solve the above-mentioned problem, the dynamic distribution method and tuning method are disclosed in U.S. Pat. No. 8,230,447, Japanese Patent Application Laid-open Publication No. 2006-259812, and Auto Scaling Developer Guide API Version 2011-01-01 (searched on the Internet on Jul. 2, 2015). U.S. Pat. No. 8,230,417 discloses a method in which a resource management unit that manages the resource of CPU (central processing unit), for example, in a server is configured to link a queue and a thread pool for processing the queue to each process, and assign a thread depending on the number of waiting queues. Japanese Patent Application Laid-open Publication No. 2006-259812 discloses a method in which queues are linked to a plurality of servers and the queues are distributed to a desired destination depending on the number of waiting queues. Auto Scaling Developer Guide API Version 2011-01-01 discloses a method to increase and decrease the number of servers.

In recent years, some of the IoT service systems are configured to use various types of data with different sizes sent from a number of different types of sensors for various business purposes, and are therefore required to perform complex data processing and distribution. The IoT service system in the electric power field, for example, performs data processing for different regions, times, and data formats on the data collected from smart meters or home energy management systems (HEMS) by respective destinations such as power companies, general electric power providers, and power suppliers. The IoT service system in the industrial field conducts data processing to match data collected from video cameras or devices such as tablets in addition to the information from manufacturing equipment for monitoring and maintenance purposes.

In many cases, this complex data processing is performed in the form of the service oriented architecture (SOA) or micro-service architecture in which a series of data processing is divided into a plurality of modules. On the other hand, the conventional scheme in which data processing is performed in one module instead of being divided is referred to as monolithic. The complex data processing is performed in a plurality of servers to improve the processing performance and secure redundancy even when there is only one type of data to be processed. Making a change or addition to the sensor data usage purpose, or making a change or addition to the destination requires the IoT service system, which performs the complex data processing as described above, to perform system updates frequently.

However, the method disclosed in U.S. Pat. No. 8,230,447, Japanese Patent Application Laid-open Publication No. 2006-259812, and Auto Scaling Developer Guide API version 2011-01-01 are not based on an architecture that can be applied to complex data processing, and therefore, may not be able to solve the technical challenges described below.

First, it is difficult to perform the bottleneck analysis on complex data processing, and therefore, resources such as CPU and I/O of the server cannot be fully utilized, for example. Even if more servers are added, the performance capability does not improve in proportion to the number of added servers, which leaves a major challenge in the distribution processing system designed to extend the capability by adding more servers.

Secondly, the complex data processing is divided into a plurality of modules, and the respective data processing is linked to each other to finish the series of data processing (below, a flow of the series of data processing will be referred to as a data flow). For example, the IoT service system in the electric power field described above uses a data flow that includes a plurality of different types of data processing such as a protocol conversion process of messages collected from the smart meters, a process to output statistic information by area based on the plurality of messages, a process to output statistic information by time based on the plurality of messages, a protocol conversion process of messages collected from HEMS, and a matching process between messages from HEMS and messages from smart meters. The IoT service system in the electric power field performs this data flow, thereby conducting different types of data processing for different destinations such as electric power companies, general power providers, and power suppliers.

In this data flow, if a configuration change or process change is made to one type of the data processing, and if the consumption amount of resources differs between before and after the change, the balance of resource consumption between the respective processes, which are interconnected to each other in a complex manner, would change, and as a result, a new bottleneck would occur. This would generate the need of conducting the load distribution design and tuning.

Thirdly, in the technology that applies the method disclosed in U.S. Pat. No. 8,230,447 to the complex data processing described above, the existing resources are all used for the first bottleneck data processing, and therefore, the through-put of the IoT service system cannot be maximized in some cases. U.S. Pat. No. 8,230,447 describes the resource management in one server, but not for a system including a plurality of servers. The methods described in Japanese Patent Application Laid-open Publication No. 2006-259812 and Auto Scaling Developer Guide API Version 2011-01-01 are also for a single data processing type, and do not describe a method to solve the bottleneck issue in the complex data processing described above.

SUMMARY

An object of the disclosure is to improve the through-put of a data flow group that includes a plurality of different types of data processing.

An aspect of the disclosure in this application is a data processing system and a data processing method, the data processing system configured to conduct data processing on a message from an sender and send the message to a destination, comprising: at least one each of a plurality of types of data processing module conducting different types of the data processing; a plurality of data flows through which a series of different types of data processing is conducted on the message and the message that was subjected to the series of different types of data processing is sent to the destination; and a dispatcher configured to distribute the message and a message that was subjected to the data processing by the data processing module to a subsequent data processing module, wherein the dispatcher conducts: a detection process to detect a specific data processing module in a specific status of being a bottleneck or being likely to be a bottleneck; a determining process to determine the number of the specific data processing module detected in the detection process so as to resolve the specific status by increasing the number of the specific data processing module; and a setting process to set the number of the specific data processing module to the number determined in the determining process so as to resolve the specific status.

According to the representative embodiments of the disclosure, it is possible to improve the through-put of a data flow group that includes a plurality of different types of data processing. Other objects, configurations, and effects than those described above are clarified by the following description of an embodiment.

BRIEF DESCRIPTION OF THE DRAWINGS

FIG. 6 is a diagram for explaining an example of the storage content of the data processing table.

DETAILED DESCRIPTION OF THE EMBODIMENT

The data processing system of this embodiment controls the volume of messages that run through a data flow indirectly by controlling the number of data processing modules that perform data processing on messages in the data flow in which a plurality of types of data processing are combined in a complex manner, or in other words, by controlling resources. This way, the bottleneck issue that occurs in the data flow is solved, and the through-put of a data flow group that includes a plurality of different types of data processing can be improved. In this embodiment, a message is data that comprises at least one packet, and includes a header and a body. Examples of the message include e-mails in mobile phones, message data of social network services (SNS), sensor information, and data transmitted from mobile phones, personal computers, automobiles, trains, and factory equipment.

This embodiment is applied to the message processing of the IoT/M2M services such as mobiles phones, personal computers, automobiles, trains, and factory equipment, for example. Specifically, this embodiment is applied to the processing of data provided by utility smart meter or HEMS.

In this embodiment, "volume" means the number of messages processed per unit time. For example, the "volume" of a data processing module is the value obtained by subtracting the number of outbound messages from the number of inbound messages per unit time, and the "volume" of a data flow is a statistical value (maximum value, minimum value, median or average, for example) of the volume of each data processing module on a data flow.

<System Configuration>

Figure 1:
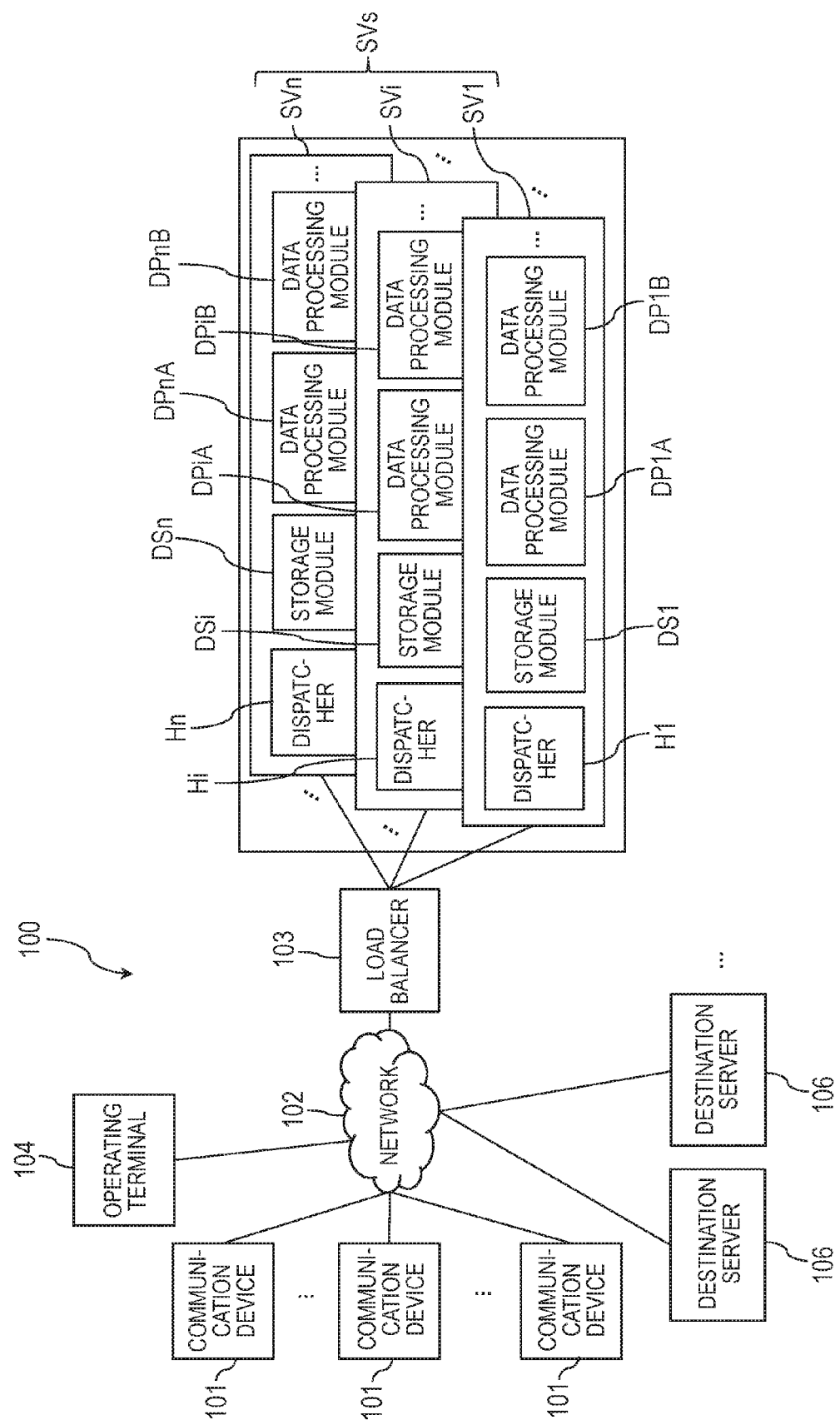
FIG. 1 is a block diagram showing an example of the system is configuration of a network system of this embodiment.

FIG. 1 is a block diagram showing an example of the system configuration of a network system 100 of this embodiment. In the network system 100, at least one communication device 101, a load balancer 103, a server group SVs, an operating terminal 104, and at least one destination server 106 are connected via network 102 so as to be able to communicate with each other.

The communication device 101 is a computer that has access to a server SVi (i is an identifier for a server, and is defined as 1≤i≤n (n is an integer of 2 or greater)) in the server group SVs. The communication device 101 is a device that is capable of data communication such as a mobile phone, tablet, personal computer, smart meter, HEMS, sensor device, and automobile, and is configured to transfer an obtained message to the server group SVs. The communication device 101 may be an intermediate server or gate way that is configured to collect messages from the device capable of data communication and transfer those messages to the server group SVs periodically.

Examples of the network 102 include the Internet, Local Area. Network (LAN), and Wide Area Network (WAN). The network 102 may be wired or wireless. The load balancer 103 distributes the messages from the communication device 101 to the respective servers SVi in a round-robin manner.

As described above, a message from the communication device 101 comprises a header and a body, and the header includes the address of the destination server, the receiving port number of the server SVi, and the data flow identifier. The destination of the message and the data flow to be used are set in advance for each communication device 101, for example.

The server group SVs is a data processing system that includes a plurality of servers SV1 to SVn. The respective servers SVi can communicate with each other. Each server SVi includes a dispatcher Hi, a storage module DSi, and a data processing module DPiX (X is an alphabet that indicates the type of data processing). The data processing module DPiX may be referred to as a data processing module DPX when it is not necessary to clarify which server SVi the data processing module belongs to.

The dispatcher Hi distributes messages from the communication device 101 or messages that have gone through the data processing X by the data processing module DPX to at least one data processing module DPY (Y≠X) in accordance with the data flow described below. The load balancer 103 merely distributes connections from the communication devices 101. The dispatcher Hi first stores a message received from the communication device 101 via the load balancer 103 in the storage module DSi, and then distributes the message to the respective data processing modules DPX.

Specifically, the dispatcher Hi, for example, receives a message through a port identified by the port number included in the header of the message, and identifies a data flow for the message based on the identifier of the data flow. Then, the dispatcher Hi transfers the message through the storage module DSi in accordance with the identified data flow. By having the dispatcher Hi assure reliable transmission of the received message, it is possible to even out the amount of messages flowing into each data processing module DPX, and to immediately response to the communication device 101 (so as to reduce the number of messages that need to be resent or to avoid congestion).

The dispatcher Hi accesses the storage module DSi and causes the storage module DSi to write in a message or read out a message to the dispatcher Hi. That is, the storage module DSi conducts processes in accordance with a request from the dispatcher Hi to store, update, or delete data. Examples of the storage module DSi include a distributed key-value store (KVS) that duplicates a message and stores the same messages in a plurality of servers SVi, thereby functioning as a persistent storage. The storage module DSi is not limited to a distributed KVS, and other examples include data grid, external storage, and Network Attached Storage (NAS). Thus, all of the storage modules DSi store the same data therein. The storage module DSi may also be present outside of the server SVi as long as it can be accessed by the dispatcher Hi.

The data processing module DPiX is a software module that conducts data processing X in the server SVi. The respective data processing modules DPiX with X being the same alphabet conduct the same type of data processing X. For example, the data processing modules DPiA and DPiB in a server SVi conduct different types of data processing A and B, and the data processing modules DP1A, DPiA, and DPnA conduct the same type of data processing A.

The process to output statistical information by area based on a plurality of messages differs from the process to output statistical information by time based on a plurality of messages. The protocol conversion process of messages collected from smart meters differs from the protocol conversion process of messages collected from HEMS. Thus, there may be a plurality of data processing modules DPiX of the same type in the same server SVi. In this case, the respective data processing modules are denoted as DPi-1X, DPi-2X and so forth.

The server SVi also includes other programs, and there is no intention to exclude those programs. The server SVi may be a physical server or virtual server. In the IoT service, when a server is on-premises and the server resource is limited, the dispatcher Hi, the storage module DSi, and the data processing module DPiX are often realized as server programs in the same server SVi, and on the other hand, in a cloud environment such as a data center, the dispatcher Hi, the storage module DSi, and the data processing module DPiX are often realized as a virtual machine or physical server. The system configuration of this embodiment is not limited to FIG. 1, and this embodiment may be applied to a messaging system of other configurations.

The data processing module DPX conducts data processing X, and sends a message subjected to the data processing X to the dispatcher Hi or the destination server 106 in accordance with the data flow. Any software that has the function of inputting and outputting a message may be used for the data processing module DPX. Examples of the data processing module DPX include a control program for RDB (relational database), mail box, on-line storage system, and user information management server.

The respective data processing modules DPX may be different versions of the same program, or may be composed of a plurality of different programs compatible with each other (for example, the data processing modules DPX may have a common access protocol (SQL) such as database, and may have a separate program). This can be used to extract issues in upgrading the data processing module DPX, or to extract issues during a transition period in updating the data processing module DPX.

With this configuration, the data included in a message (such as SQL text) from the communication device 101 is written in a plurality of storage modules DSi via the dispatchers Hi, and therefore, it is possible to duplicate the data without modifying the data processing module DPiX.

The destination server 106 is connected to the server group SVs, and receives a message sent from the data processing module DPX. For example, in the example of the electric power, the destination server 106 is a system of an electric power company, a system of a general power provider, or a system of a power supplier, which utilizes messages from smart meters or HEMS.

<Logical Connection Relationship of Server Group SVs>

Figure 2:
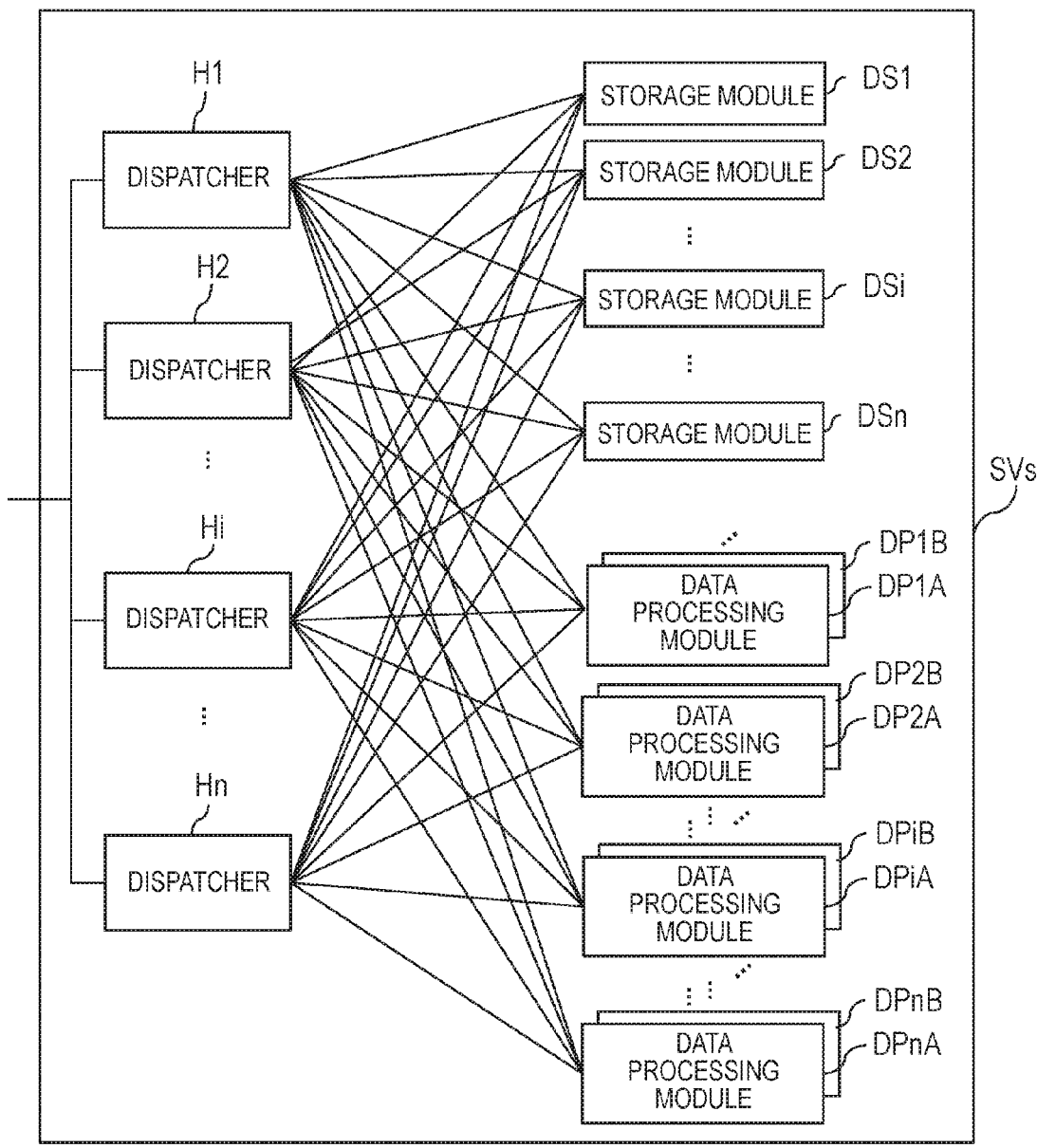
FIG. 2 is a diagram for explaining the logical connection relationship of the server group.

FIG. 2 is a diagram for explaining the logical connection relationship of the server group SVs. As shown in FIG. 2, the dispatcher Hi has access to the respective storage modules DSi. The dispatchers Hi and the data processing modules DPi have access to each other.

<Hardware Configuration Example of Server SVi>

Figure 3:
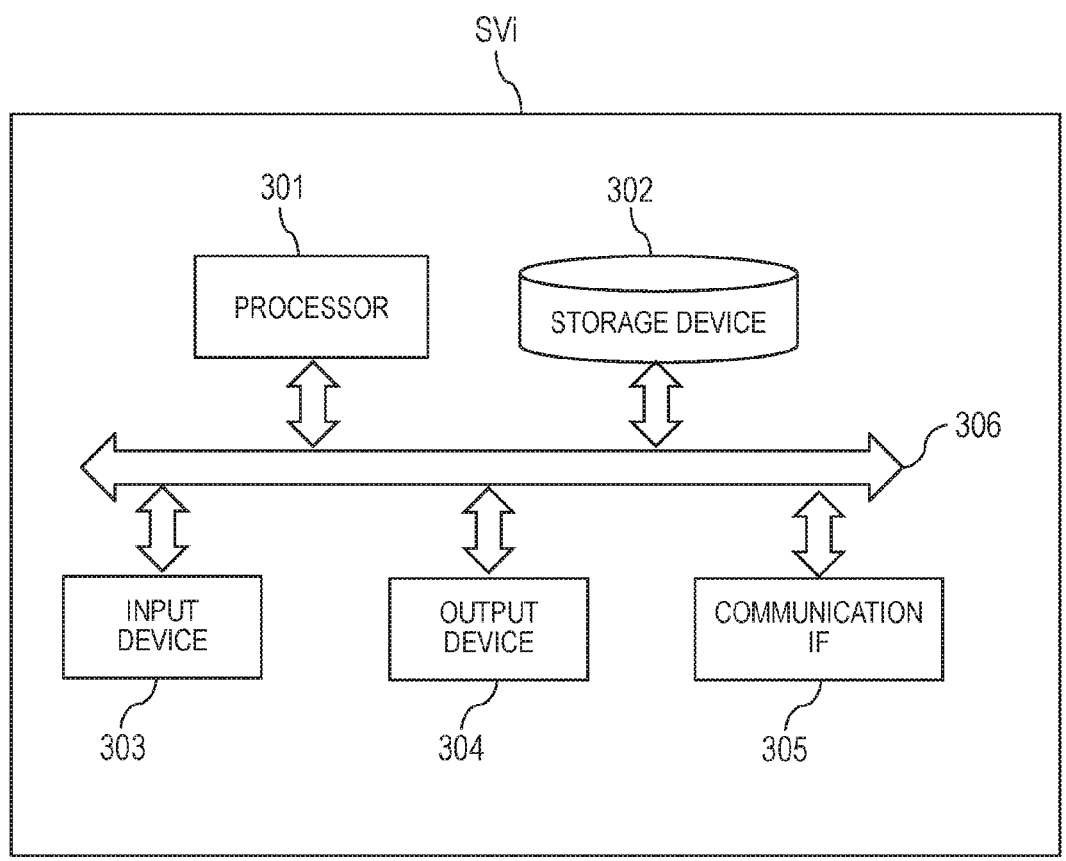
FIG. 3 is a block diagram illustrating a hardware configuration example of the server.

FIG. 3 is a block diagram illustrating a hardware configuration example of the server SVi. The server SVi includes a processor 301, a storage device 302, an input device 303, an output device 304, and a communication interface (communication IF) 305. The processor 301, the storage device 302, the input device 303, the output device 304, and the communication IF 305 are connected to one another by a bus 306. The processor 301 controls the server SVi. The storage device 302 serves as a work area of the processor 301. The storage device 302 is a recording medium which stores various programs and data. The storage device 302 can be, for example, a read-only memory (ROM), a random access memory (RAM), a hard disk drive (HDD), or a flash memory.

The input device 303 inputs data. The input device 303 can be, for example, a keyboard, a mouse, a touch panel, a ten-key pad, or a scanner. The output device 304 outputs data. The output device 304 can be, for example, a display or a printer. The communication IF 305 couples to a network to transmit and receive data.

<Storage Device 302>

Figure 4:
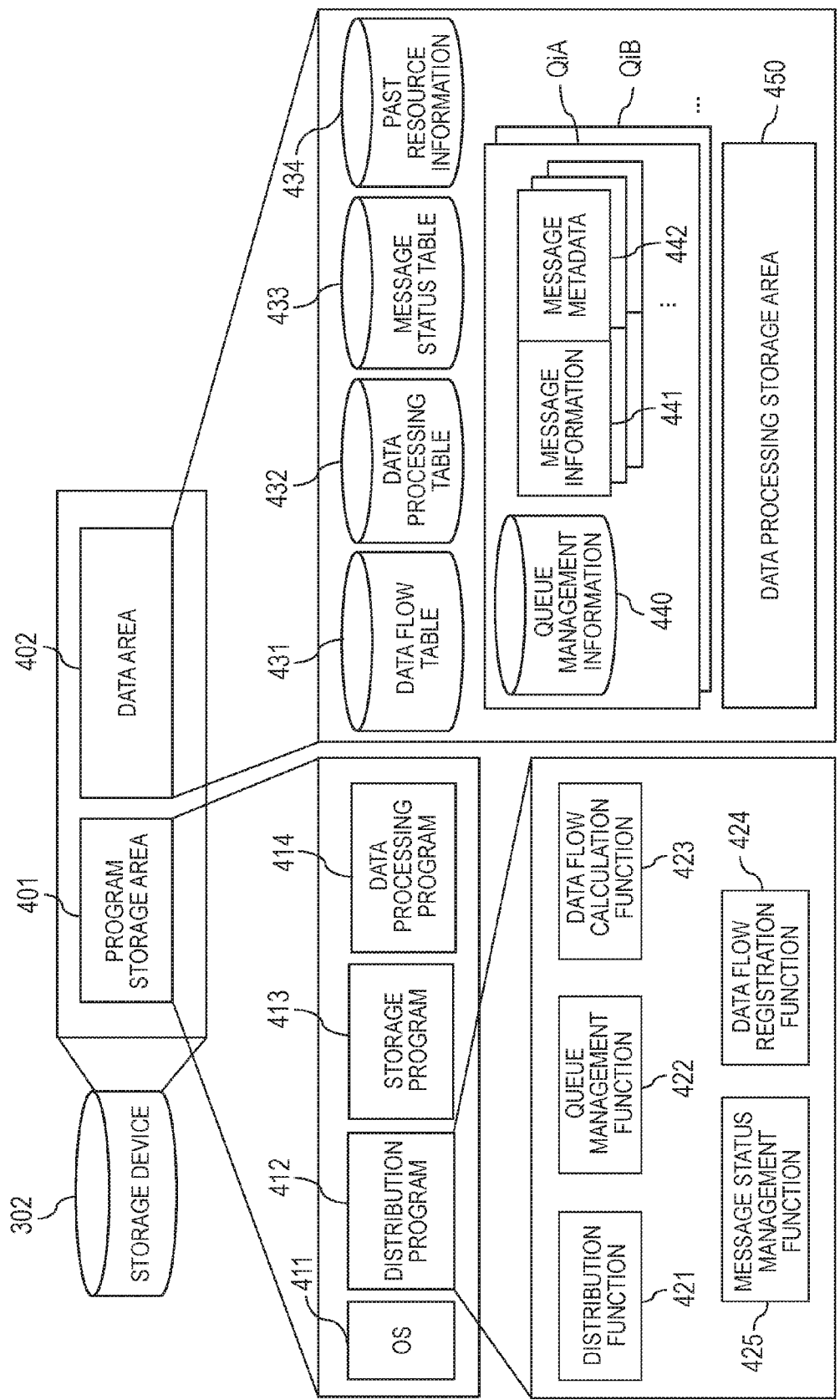
FIG. 4 is a diagram for explaining an example of the storage content of the storage device of the server.

FIG. 4 is a diagram for explaining an example of the storage content of the storage device 302 of the server SVi. The storage device 302 includes a program storage area 401 and a data area 402. In the program storage area 401, Operating System (OS) 411, a dispatcher program 412, a storage program 413, and a data processing program 414 are stored.

The dispatcher program 412 is run by the processor 301, and thereby functions as the dispatcher Hi. The storage program 413 is run by the processor 301, and thereby controls the storage module DSi. The data processing program 414 is run by the processor 301, and thereby functions as the data processing module DPiX.

In the descriptions of this specification, the respective processes of the dispatcher Hi, the storage module DSi, and the data processing module DPiX are explained as if the dispatcher Hi, the storage module DSi, and the data processing module DPiX are performing each process for ease of explanation, but in reality, the respective processes of the dispatcher Hi, the storage module DSi, and the data processing module DPiX are performed by the processor 301 running the dispatcher program 412, the storage program 413, and the data processing program 414 as described above. The respective programs and the functions thereof may be the subject of a sentence for convenience of explanation.

In the data area 402, a data flow table 431, a data processing table 432, a message status table 433, past resource information 434, and a queue QiX are stored. The data area 402 also has a data processing storage area 450.

The data flow table 431 is a table that defines the data flow. The data flow is a table that defines a data processing module DPiX through which a message travels. The data flow table 431 will be explained in detail below with reference to FIG. 5.

The data processing table 432 is a table that manages the data processing module DPiX. The data processing table 432 will be explained in detail below with reference to FIG. 6.

The message status table 433 is a table that manages the status of a message that travels through the data flow. Specifically, the message status table 433 stores therein a log that indicates a queue and data processing module DPiX through which a message waiting in queue has traveled, for example.

The past resource information 434 stores therein the past resource value for each data processing module DPiX. The resource value is a CPU usage rate or CPU processing time, for example, and the pre-update resource value is stored when the resource value of the data flow table 431 described below is updated.

The queue QiX is a FIFO memory. The queue QiX has queue management information 440, stores messages from the dispatcher Eli and the data processing module DPiX, and outputs the messages in the order of being stored. The queue QiX is associated with the data processing module DPiX by the data processing table 432. In each server SVi, the queue QiX outputs a message to the corresponding data processing module DPiX.

The queue management information 440 manages the queue length of the queue QiX, the number of messages stored in the queue QiX, the inbound message volume in the queue QiX, the outbound message volume in the queue QiX, and information that specifies the subsequent queue QY. The number of messages may be replaced with the volume of messages waiting in the queue QiX (waiting message volume). If the size of each message is the same, the number of messages may be used. However, the size shall be managed by the queue management information 440.

The inbound message coming to the queue QiX includes message information 441 and message metadata 442. The message information 441 is a header and body of the message. The message metadata 442 is a log that indicates a queue QiX and data processing module DPiX through which a message waiting in the queue QiX has traveled. That is, the information stored in the message status table 433 described above is not a log to be exact, but a pointer to call upon the message metadata 442. The pointer is generated by the storage program 413 when a message arrives at the queue QiX.

In this example, the storage module DSi of each server SVi is configured to have a queue QiX for each data processing X, but the storage module DSi may have a single queue Qi for all data processing.

The data processing storage area 450 is a work area where the data processing program 414 processes a message.

The dispatcher program 412 includes program modules such as a distribution function 421, a queue management function 422, a data flow calculation function 423, a data flow registration function 424, and a message status management function 425.

The distribution function 421 refers to an identifier (flow ID) of a data flow included in a message received from the communication device 101, and identifies a data flow to distribute the message. The distribution function 421 stores a message received from the communication device 101 in a queue QiX in the storage module DSi, which has access to the data processing module DPX that is the destination of the identified data flow. The distribution function 421 also receives a message from the data processing module DPX that has undergone the data processing by the data processing module DPX The distribution function 421 stores the received message in a queue QY having access to the data processing module DPY that is the destination of the data flow. Y and X are different alphabets, indicating that those are different types of data processing.

The queue management function 422 determines whether or not the data processing module DPX corresponding to the queue QX is a bottleneck or is likely to be a bottleneck based on the information managed in the queue management information 440. Specifically, when the amount of waiting is messages reaches 80% of the queue length of the queue QX, the queue management function 422 determines that the data processing module DPX is likely to be a bottleneck, and when the amount reaches 90%, the queue management function 422 determines that the data processing module DPX is a bottleneck, for example. The queue management function 422 may alternatively be configured so as to determine that the data processing module DPX is a bottleneck when the inbound message amount (or the message amount obtained by subtracting the outbound message amount from the inbound message amount) is greater than the available space of the queue QX.

The data flow calculation function 423 defines a flow volume control value, which is the dynamic setting value for controlling the distribution process performed by the distribution function 421, based on the data flow table 431, the data processing table 432, and the queue management information 440. The process to calculate the flow volume control value is referred to as flow calculation, and will be explained in detail in FIG. 9.

The data flow calculation function 423 actively calculates the flow volume control value and stores the result in the data processing table 432 in order to effectively utilize the server resource and extend the processing capability.

The data flow registration function 424 registers a data flow, which is a flow of a message that goes through the data processing module DPX, in the data flow table 431 in accordance with the operation of the operating terminal 104.

The message status management function 425 adds, to the message metadata 442, information that indicates each data processing module DPX in which messages are currently being processed.

The storage program 413 is a program that controls the storage module DSi. Specifically, the storage program 413 stores a message in the queue QiX, outputs a message from the queue QiX, stores the queue management information 440, generates the message metadata 442, and generates a pointer in the message status table 433, for example.

The data processing program 414 is a program for processing a message. Specifically, the data processing program 414 conducts various types of data processing such as a protocol conversion process of a message, a process to output statistic information by area from a plurality of messages, a process to output statistic information by time from a plurality of messages, a matching process between messages, a compression process, an extension process, an encryption process, and a decryption process, for example.

<Data Flow Table 431>

Figure 5:
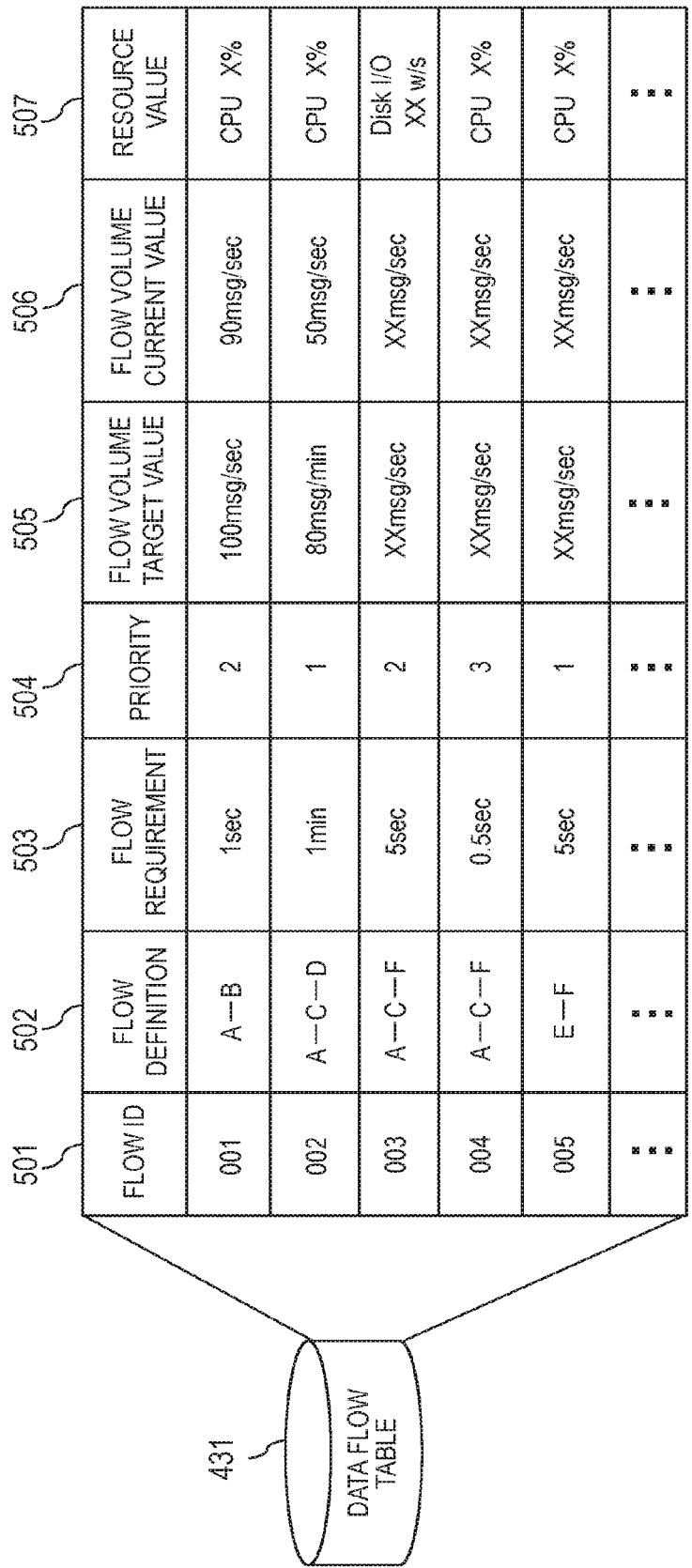
FIG. 5 is a diagram for explaining an example of the storage content of the data flow table.

FIG. 5 is a diagram for explaining an example of the storage content of the data flow table 431. The data flow table 431 includes a flow ID field 501, a flow definition field 502, a flow requirement field 503, a priority field 504, a flow volume target value field 505, a flow volume current value field 506, and a resource value field 507, and the respective values in the those fields constitute an entry that defines a data flow. Below, a value in the xx field yyy (xx is the field name, and yyy is the reference character) will also be referred to as xxyyy. For example, a flow ID, which is the value of the flow ID field 501 will be referred to as flow ID 501.

The flow ID field 501 is a storage area that stores a flow ID 501, which is an identifier for a data flow. The flow definition field 502 is a storage area that stores a flow definition 502, which is the definition information of a data flow. For example, if the flow definition 502 is "A-C-D," this indicates a data flow in which a message goes from the data processing module DPA to the data processing module DPC to the data processing module DPD, and the message that has undergone data processing D is delivered to the destination server 106.

The flow requirement field 503 is a storage area that stores a flow requirement 503. The flow requirement 503 is a requirement that defines the required performance for the data flow. Examples of the flow requirement 503 include the time from when a message is received by the dispatcher Hi of the server SVi from the communication device 101 to when the message is delivered to the destination server 106, or a response time to the communication device 101.

The priority field 504 is a storage area that stores a priority 504. The priority 504 is a value that indicates the priority among a plurality of data flows. The priority 504 is used when the resource needs to be allocated in the flow calculation described below. The values in the flow ID field 501 to the priority field 504 are set via the operating terminal 104 in advance.

The flow volume target value field 505 is a storage area that stores a flow volume target value 505. The flow volume target value 505 is a value calculated based on the data processing table 432 described below, and is the target value of the message flow volume in the data flow defined by the flow definition 502. The flow volume target value 505 is actively updated by the data flow calculation function 423. For example, the statistical value (such as maximum value, minimum value, median value, or average value) of the flow volume control value (the value of a flow volume control information field 605 described below) of the data processing module DPiX on the data flow is used for the flow volume target value 505. The flow volume control value controlled by the dispatcher Hi is set for each data processing module DPiX. The flow volume target value 505 is used as an indication to the operator.

The flow volume current value field 506 is a storage area that stores a flow volume current value 506. The flow volume current value 506 is the current message flow volume obtained from the queue management information 440, and is regularly updated. The flow volume current value 506 is the current flow volume of a data flow and therefore, the statistic value (such as maximum value, minimum value, median value, or average value) of the current flow volume of each data processing module DPiX on the data flow is used for the flow volume current value 506.

The resource value field 507 is a storage area that stores a resource value 507. The resource value 507 is the value of the resource used by this data flow. The resource includes the CPU usage, and disk and network I/O processing numbers, for example. The dispatcher Hi collects and sums up the values of the current resources of the respective data processing modules DPX on the data flow, for example, and the total value is stored in the resource value field 507 as the resource value 507. The dispatcher Hi stores the resource value 507 before the past resource information 434 is updated.

<Data Processing Table 432>

FIG. 6 is a diagram for explaining an example of the storage content of the data processing table 432. The data processing table 432 is a table that manages the data processing module DPiX in the server SVi for each queue QX. The data processing table 432 includes a queue ID field 601, a process name field 602, a resource requirement field 603, a process priority field 604, a flow volume control information field 605, a flow volume current value field 606, a resource value field 607, and a protocol information field 608, and the respective values of those fields constitute an entry that defines the status of the data processing module DPiX managed by the server SVi for each queue QX.

The queue ID field 601 is a storage area that stores a queue ID 601. The queue ID 601 is identification information that uniquely identifies a queue QX. The queue QX may be a queue QjX in another server SVj (j≠i). The process name field 602 is a storage area that stores a process name 602. The process name 602 is identification information that uniquely identifies data processing X of the data processing module DPiX that processes data from the queue QX, or a type of the distribution process to the destination server 106 that receives data from the queue QX. The combination of the queue ID 601 and the process name 602 associates the queue QX with the data processing module DPiX.

The resource requirement field 603 is a storage area that stores a resource requirement 603. The resource requirement 603 defines the capability required for the data processing module DPiX identified by the process name 602. For example, if the resource requirement 603 is "own server," this means that the data processing modules DPiX of the same type are to be distributed in the own server SVi, and if the resource requirement 603 is "another server," this means that the data processing modules DPiX of the same type are to be distributed in another server SVj.

If the resource requirement 603 includes "(auto extension available)," this means that the dispatcher Hi or the operator can extend the resource in collaboration with the operating function to distribute the data processing modules DPiX, or in other words, this means that the resource can be extended physically or virtually. If the resource requirement 603 includes "(auto extension not available)," the automatic extension described above is not available in distributing the data processing modules DPiX. In this case, the insufficient resource needs to be made up for by the existing data processing modules DPiX of the own server SVi and other servers SVj.

The process priority field 604 is a storage area that stores the process priority 604 of the data processing module DPiX identified by the process name 602. The process priority 604 indicates the priority level of the data processing module DPiX among the respective entries in the data processing table 432. In this example, the greater the value of the process priority 604 is, the higher the priority is.

The flow volume control information field 605 is a storage area that stores flow volume control information 605. The flow volume control information 605 is a combination of the distribution number and the flow volume control value of the data processing modules DPiX of the same process name 602, or in other words, of the same type. The distribution number is the number of the data processing modules DPiX of the same type that are processed in parallel, or in other words, the number of data processing modules DPiX distributed by the dispatcher Hi. The flow volume control value is the value controlled by the dispatcher Hi. The flow volume control value is the target value of the message flow volume from the queue QiX to the data processing modules DPiX corresponding to the distribution number. For example, if the flow volume current values 505 and 606 are less than the flow volume control value, the dispatcher Hi can send a message to the data processing module DPiX. The flow volume control information 605 is actively updated by the data flow calculation function 423.

The distribution number means the number of data processing modules DPX of the same type that conduct process at the same time under the control of the dispatcher Hi, and this configuration enables the dispatcher Hi to control the number of data processing modules DPX that conduct process at the same time. When the number of available data processing modules DPX is greater than the distribution number, or in other words, when there are data processing modules DPX that are not utilized, increasing the distribution number allows the data processing modules DPX to process data in any server SVi. On the other hand, when the number of data processing module DPX is equal to or smaller than the distribution number, the number of data processing modules DPX is increased so as not to exceed the distribution number by referring to the number of unused data processing modules PDX in the server group SVs. If there are not enough data processing modules DPX, a new data processing module DPX needs to be deployed or automatically added through the operating function of the data processing system.

The flow volume current value field 606 is a storage area that stores a flow volume current value 606. The flow volume current value 606 is the current flow volume of the messages flowing into the data processing module DPiX. The flow volume current value 606 is obtained from the queue management information 440.

The resource value field 607 is a storage area that stores a resource value 607. The resource value 607 is the value of the resource used by the data processing module DPiX identified by the process name 602. The resource includes the CPU usage, and disk and network I/O processing numbers, for example. The resource value 607 may be the current value of the resource of the data processing module DPiX directly collected by the dispatcher Hi, or may be the current value of the resource of the data processing module DPiX calculated from the characteristics or processing content of the data processing module DPiX.

The protocol information field 608 is a storage area that stores protocol information 608. The protocol information 608 includes the protocol for sending a message from the dispatcher Hi to the data processing module DPiX identified by the process name 602, and settings information regarding the message sending method. Because the input protocol varies depending on the type of the data processing module DPiX, the dispatcher Hi converts a protocol of a message to another protocol corresponding to the protocol information 608 before distributing the message. The message sending method also has several different types such as a method in which a notification is sent to the data processing module DPiX when a message has arrived from the dispatcher Hi, and the data processing module DPiX, triggered by the notification, retrieves the message, a method in which the dispatcher Hi directly sends a message to the data processing module DPiX, and a polling method in which the data processing module DPiX regularly accesses the data processing module DPiX. The settings information is identification information that indicates a message sending method.

<Data Processing Example>

Figure 7:
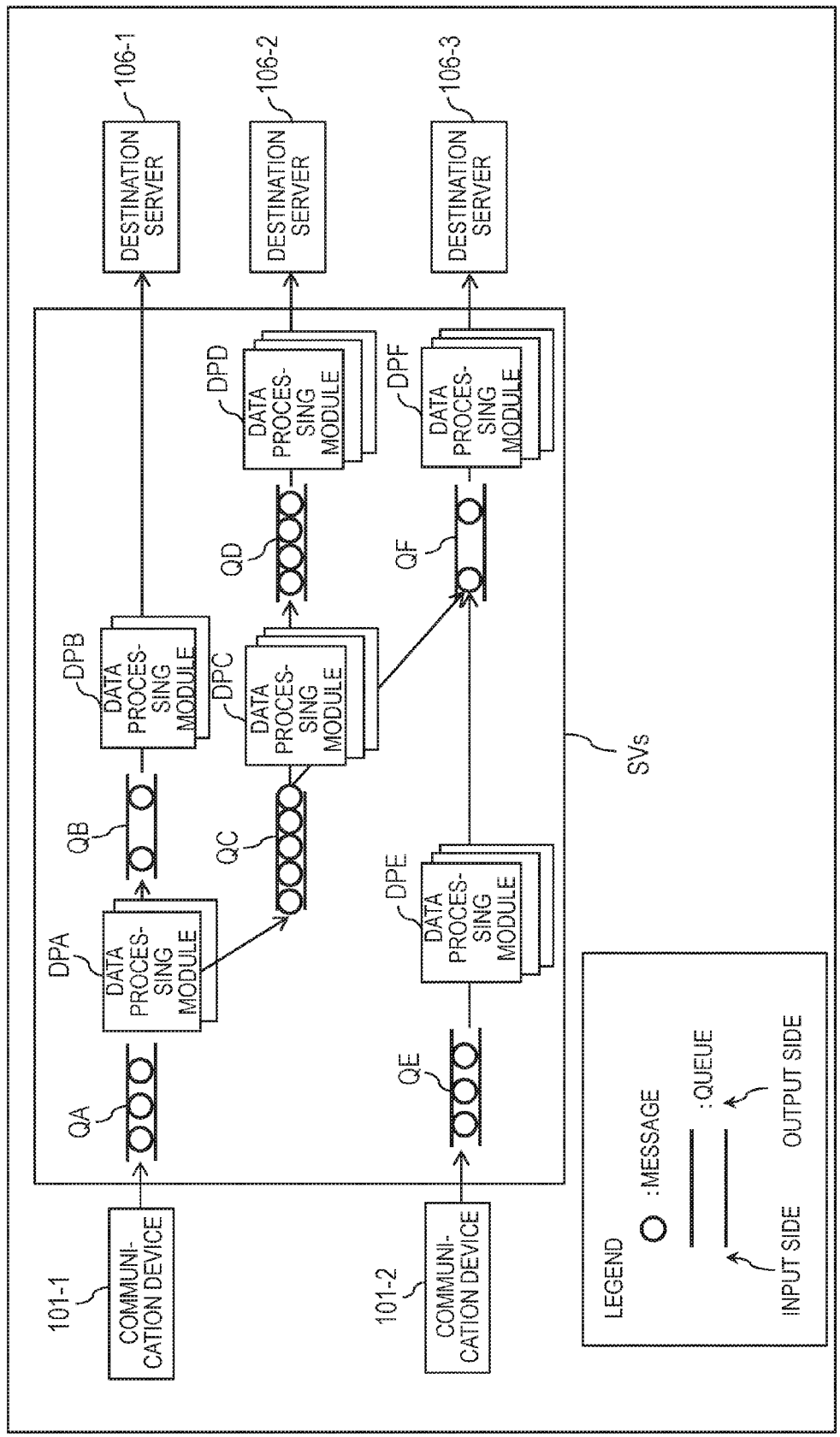
FIG. 7 is a diagram for explaining a data processing example in a distribution system.

FIG. 7 is a diagram for explaining a data processing example in a distribution system. FIG. 7 shows four data flows of "A→B," "A→C→D," "A→C→F," and "E→F." The server group SVs has at least one of each data processing module DPA to DPF. In the example of FIG. 7, for example, the server group SVs has two data processing modules DPA and DPB, respectively, and three data processing modules DPC to DPF, respectively. A plurality of data processing modules DPX of the same type may be present in the same server SVi or in a plurality of servers SVj. However, the arrangement is made in accordance with the resource requirement 603 of the data processing table 432. Although there are a plurality of data processing modules DPX of the same type, the explanation will be made focusing on one data processing module DPX. In FIG. 7, the explanation will be mainly made for the data flow "A→B."

The dispatcher Hi associates each data processing module DPX with a queue QX, and manages the correspondence relationship in the data flow table 431 and the data processing table 432. First, the dispatcher Hi stores a message received from the communication device 101-1 in the queue QA. Next, the data processing module DPA retrieves the message from the queue QA via the dispatcher Hi, and conducts data processing A.

The data processing module DPA appoints a queue QB corresponding to the data processing module DPB in accordance with the data flow "A→B," and appoints a queue QC corresponding to the data processing module DPC in accordance with "A→C→D" and "A→C→F." The dispatcher Hi sends a message subjected to the data processing A to the appointed queues QB and QC. The queues QB and QC store the received message, respectively.

Next, the data processing module DPB retrieves a message from the queue QB via the dispatcher Hi, and conducts data processing B. Then the data processing module DPB sends the message subjected to the data processing B to the destination server 106-1. The same process is conducted for the data flows "A→C→D," "A→C→F," and "E→F." The data processing module DPF conducts data processing F on the message subjected to data processing C in the data processing module DPC and the message subjected to the data processing E in the data processing module DPE.

<Relationship Between Queue QX and Data Processing Module DPX>

The relationship between the queue QX and the data processing module DPX will be explained. A server SVi that has received a series of messages specifying the same data flow "A→B" from the communication device 101 is defined as a server SV1 (i=1), for example. In the data flow "A→B," the data processing module DPA conducts data processing A, the message subjected to the data processing A is provided to the data processing module DPB that conducts the data processing B, and then the message subjected to the data processing B is sent to the destination server 106.

An example in which the data processing module DPA indicates four data processing modules DP1-1A, DP1-2A, DP2A, and DP3A, and an example in which the data processing module DPB indicates two data processing modules DP1B and DP2B will be explained.

The first example is where the queue QiX of another server SVi corresponds to the data processing module DPX. The server SV1 stores a series of received messages M1 to M4 in the queue Q1A by the dispatcher H1. The dispatcher H1 retrieves the series of messages M1 to M4 from the queue Q1A in the input order. The dispatcher H1 distributes the message M1 retrieved from the queue Q1A to the data processing module DP1-1A, the next message M2 to the data processing module DP1-2A, the next message M3 to the DP2A, and the next message M4 to the DP3A.

The next data processing X on the data flow "A→B" is the data processing B, and therefore, the four data processing modules DP1-1A, DP1-2A, DP2A, and DP3A appoint the queue QB, and return the messages M1 to M4 subjected to the data processing A (will be referred to as the messages M1A to M4A) to the dispatcher H1. The dispatcher H1 appoints the queue Q1B of the own server SV1 as the queue QB, and stores the messages M1A to M4A in the queue Q1B.

The dispatcher H1 retrieves the messages M1A to M4A from the queue Q1B in an appropriate order, and distributes the message M1A to the data processing module DP1B, the message M2A to the data processing module DP2B, the message M3A to the data processing module DP1B, and the message M4A to the data processing module DP2B.

The data processing module DP1B sends the messages M1A and M3A subjected to the data processing B (will be referred to as the messages M1B and M3B) to the destination server 106, and the data processing module DP2B sends the messages M2A and M4A subjected to the data processing B (will be referred to as the messages M2B and M4B) to the destination server 106.

The second example is where the queue QiX and the data processing module DPiX correspond to each other in the own server SVi. For example, the server SV1 causes the dispatcher H1 to store messages M1 and M2 in the queue Q1A, a message M3 in the queue Q2A of the server SV2, and a message M4 in the queue Q3A, among a series of received messages M1 to M4. The dispatcher H1 retrieves the messages M1 and M2 from the queue Q1A in the input order. The dispatcher H1 retrieves the message M3 from the queue Q2A. The dispatcher H1 retrieves the message M4 from the queue Q3A.

The dispatcher H1 distributes the message M1 retrieved from the queue Q1A to the data processing module DP1-1A, and the next message M2 to the data processing module DP1-2A, for example.

The dispatcher H1 distributes the message M3 retrieved from the queue Q2A to the data processing module DP2A. The dispatcher H1 distributes the message M4 retrieved from the queue Q3A to the data processing module DP3A.

The next data processing X on the data flow "A→B" is the data processing B, and therefore, the data processing modules DP1-1A and DP1-2A appoint a queue Q1B, and return the messages M1A to M2A subjected to the data processing A to the originating dispatcher H1. The data processing module DP2A appoints a queue Q2B, and returns the message M3A subjected to the data processing A to the originating dispatcher H1. The data processing module DP3A appoints a queue Q3B, and returns the message M4A subjected to the data processing A to the originating dispatcher H1.

The dispatcher H1 appoints the queue Q1B of the server SV1 as the queue QB, and stores the messages M1A and M2A in the queue Q1B. The dispatcher H1 appoints the queue Q2B of the server SV2 as the queue QB, and stores the message M3A in the queue Q2B. The dispatcher H1 appoints the queue Q3B of the server SV3 as the queue QB, and stores the message 1414A in the queue Q3B.

The dispatcher H1 retrieves the messages M1A and M2A from the queue Q1B in an appropriate order, and distributes the message M1A to the data processing DP1B and the message M2A to the data processing module DP2B. The dispatcher H1 retrieves the message M3A from the queue Q2B, and distributes the message M3A to the data processing module DP1B. The dispatcher H1 retrieves the message M4A from the queue Q3B, and distributes the message M4A to the data processing module DP2B.

The data processing module DP1B sends the messages M1B and M3B subjected to the data processing B to the destination server 106, and the data processing module DP2B sends the messages M2B and M4B subjected to the data processing B to the destination server 106.

The first example and the second example are merely to exemplify the relationship between the queue QX and the data processing module DPX, and other examples may apply as long as they make sense. In the first example and the second example, the dispatcher H1 of the server SV1 that received messages from the communication device 101 was configured to conduct the distribution process, but those messages may be distributed by the dispatcher Hi of another server SVi to which a queue QiX that stores those messages belong.

<Data Processing Sequence>

Figure 8:
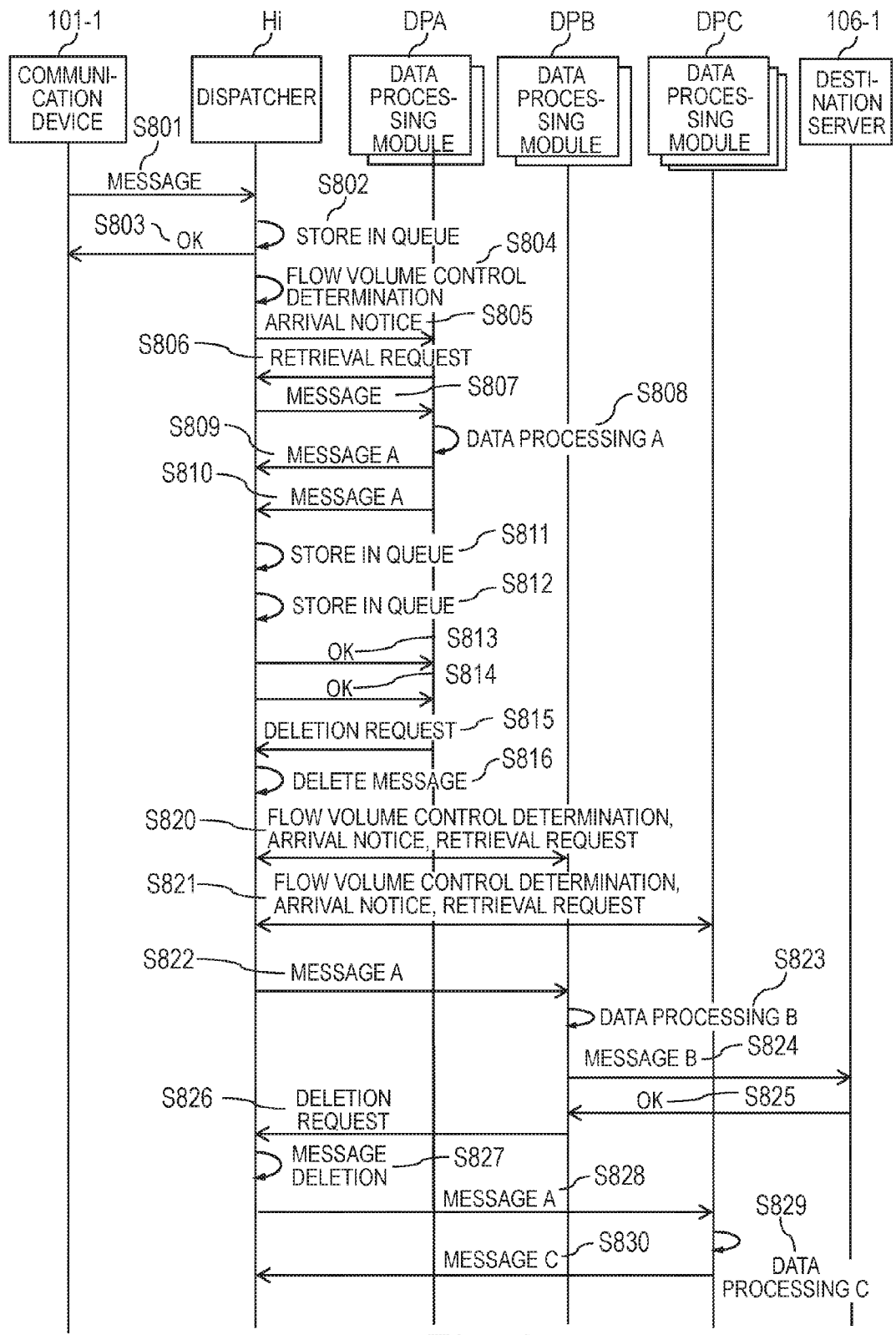
FIG. 8 is a sequence diagram showing an example of data processing sequence.

FIG. 8 is a sequence diagram showing an example of data processing sequence. In the actual configuration, the dispatcher Hi causes the storage module DSi to store the messages in the queue Qi or access the various types of tables, but in FIG. 8, the operation on the storage module DSi will be described as the process of the dispatcher Hi, and the storage module DSi will be omitted from the sequence for simplification. In FIG. 8, the explanation is made using the data flow "A→B" shown in FIG. 7.

The communication device 101-1 sends a message to the destination server 106-1 (Step S801). The load balancer 103 that has received the message transfers the message to the dispatcher Hi.

Receiving the message from the load balancer 103, the dispatcher Hi identifies the data flow for the message based on the flow ID 501 in the message by means of the distribution function 421. The dispatcher Hi then uses the distribution function 421 to store the message in the queue QA that accesses a data processing module DPA, which is to receive the message according to the data flow "A→B"

identified by the flow ID 501 (Step S802). The dispatcher Hi also updates the number of messages included in the queue management information 440 and the number of inbound messages of the queue QA. The dispatcher Hi then returns a normal response to the communication device 101-1 (Step S803).

The dispatcher Hi determines whether or not both the flow current values 506 and 606 are smaller than the flow volume control value, referring to the flow volume current value 506 in the data flow table 431 corresponding to the identified data flow, and the flow volume control value of the flow volume control information 605 and the flow volume current value 606 in the data processing table 432. If both the flow volume current values 506 and 606 are smaller than the flow volume control value, the dispatcher Hi determines that the message can be sent to the data processing module DPA, and if not, the dispatcher Hi determines that the message cannot be sent (Step S804). Below, this process will be referred to as a flow volume control determination.

In the flow volume control determination (Step S804), the dispatcher Hi determines whether both of the flow volume current values 506 and 606 are smaller than the flow volume control value, but the dispatcher Hi may determine whether or not one of the flow volume current values 506 and 606 is smaller than the flow volume control value.

After determining that the message can be sent in the flow volume control determination (Step S804), the dispatcher Hi sends an arrival notice to the data processing module DPA based on the protocol information 608 of the data processing table 432, the arrival notice indicating that the message has arrived at the queue QA (Step S805).

If determining that the message cannot be sent in the flow volume control determination (Step S804), the dispatcher Hi wait until the flow volume determination result indicates that the message can be sent before sending the arrival notice (Step S805). If the upper limit of the message amount is set for one second, for example, the dispatcher Hi performs the flow volume control determination (Step S804) again in one second.

When the data processing module DPA receives the arrival notice (Step S805), the data processing module DPA sends a retrieval request for the message to the dispatcher Hi (Step S806). In response to the retrieval request, the dispatcher Hi sends the message output from the queue QA to each data processing module DPA, and each data processing module DPA receives the message (Step S807).

In Step S807, after the message is output to the data processing module DPA, the queue QA saves the same message for a certain period of time in a locked state. While in the locked state, the message kept in the queue QA will not be sent to the data processing module DPB, which is the next data processing module on the data flow. This is to prevent the message from being lost if the data processing module DPA is stopped due to a failure or the like during the data processing A. If the data processing module DPA is stopped, for example, the dispatcher Hi unlocks the message in the queue QA after a certain period of time has passed, and distributes the message to the data processing module DPB, which is the next data processing module on the data flow.

Next, the data processing module DPA conducts the data processing A on the message (Step S808), appoints the queue QB in accordance with the data flow "A→B," and sends the message A subjected to the data processing A to the dispatcher Hi (Step S809). In a similar manner, the data processing module DPA appoints the queue QC in accordance with the data flows "A→C→D" and "A→C→F," and sends the message A subjected to the data processing A to the dispatcher Hi (Step S810).

The dispatcher Hi stores the messages A received in Steps S809 and S810 in the queues QB and QC, respectively (Steps S811 and S812), and returns a normal response (Steps S813 and S814).

Next, the data processing module DPA sends a request to the dispatcher Hi to delete the locked message kept in the queue QA in Step S807 (the message that has not underwent the data processing A) (Step S815). When receiving the request, the dispatcher Hi deletes the message (Step S816). Steps S804 to S816 are the communications performed between the dispatcher Hi and the data processing module DPA for one message.

Next, the dispatcher Hi conducts the flow volume control determination on the respective data processing modules DPB and DPC in a manner similar to Steps S804 to S806, sends out the arrival notice, and receives the retrieval request from the respective data processing modules DPB and DPC (Steps S820 and S821).

The data processing module DPB obtains the message A after Step S820 (Step S822), conducts the data processing B (Step S823), and sends the message B subjected to the data processing B to the destination server 106-1 (Step S824). The destination server 106-1 returns a normal response to the data processing module DPB (Step S825).

After receiving the normal response from the destination server 106-1 (Step S825), the data processing module DPB sends a request to the dispatcher Hi to delete the locked message kept in the queue QB (Step S826). The dispatcher Hi deletes the message A from the queue QB (Step S827).

The data processing module DPC retrieves the message A after Step S821 (Step S828), conducts the data processing C (Step S829), appoints the queue QD in accordance with the data flow "A→C→D," and sends the message C subjected to the data processing C to the dispatcher Hi (Step S830). The subsequent processes are omitted from FIG. 8, but after this, the dispatcher Hi exchanges messages with the data processing module DPD in a manner similar to Steps S820 and S821, and sends out the message to the destination server 106-2.

<Flow Calculation Process Example>

Figure 9:
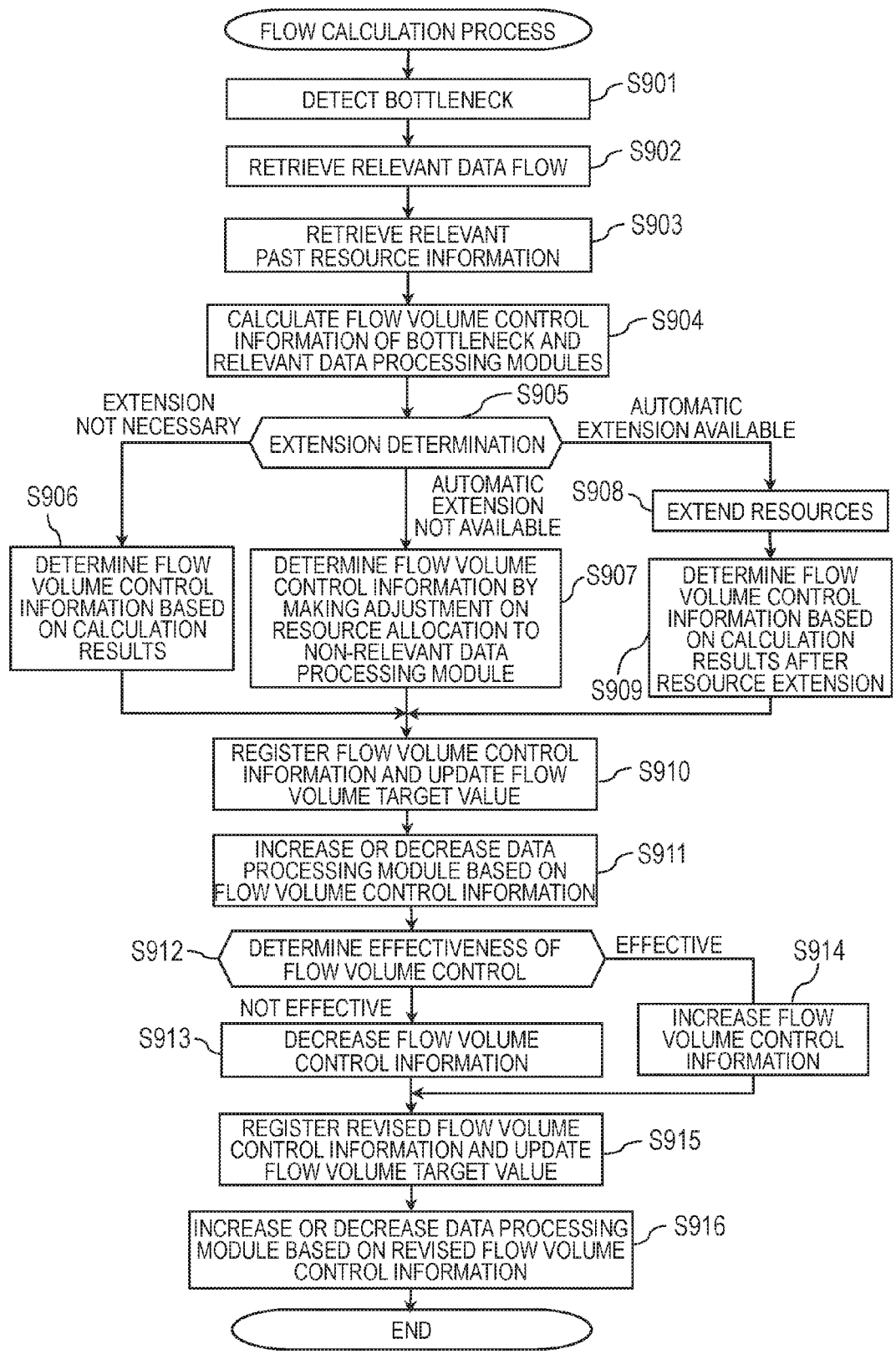
FIG. 9 is a flowchart showing an example of the flow calculation process sequence conducted by the dispatcher for the flow volume control.

FIG. 9 is a flowchart showing an example of the flow calculation process sequence conducted by the dispatcher Hi for the flow volume control. The dispatcher Hi conducts the flow calculation process at a prescribed timing such as at a certain time interval, via the data flow calculation function 423. FIG. 9 shows an example in which a bottleneck has occurred, but this process can be applied to a case in which a bottleneck is likely to occur.

The dispatcher Hi identifies a bottleneck queue QiX based on the queue length of the queue QiX and the number of waiting messages in the queue QiX, which are included in the queue management information 440. The dispatcher Hi detects, as a bottleneck, the data processing module DPiX associated with the identified queue QiX from the data processing table 432 (Step S901).

Next, the dispatcher Hi identifies a data flow (relevant data flow) related to the bottleneck data processing module DPiX from the flow definition 502 of the data flow table 431 (Step S902), and obtains the past resource information 434 (Step S903). For example, if the data processing module DPC become a bottleneck as a result of the message number of the queue QC exceeding the threshold value of the queue length, the dispatcher Hi identifies the data flows "A→C→D," and "A→C→F," which include the data processing module DPC, as the relevant data flow.

Then the dispatcher Hi identifies the bottleneck data processing module DPiX and the data processing module DPY on each identified data flow, and calculates the distribution number to be allocated for the respective data processing modules DPiX and DPY using the past resource information 434 (Step S904). Specifically, if the data processing module DPC is a bottleneck, for example, the identified data flows are "A→C→D," and "A→C→F," and therefore, the dispatcher Hi identifies the data processing modules DPA, DPD, and DPF.

The dispatcher Hi then determines the allocation of the resource to the data processing module DPC and the relevant data processing module DPA, DPD and DPF.

For the bottleneck data processing module DPC, the dispatcher Hi calculates the distribution number required to solve the bottleneck, using the past resource information 434 such as the past CPU usage of the specific data flow.

For example, the dispatcher Hi increases the number of bottleneck data processing module DPiX one by one, and calculates the CPU usage for the increased number of data processing module DPiX, and uses the calculated CPU usage to calculate the CPU usage of the identified data flow. The dispatcher Hi then finds the number of the bottleneck data processing module DPiX that makes the CPU usage of the identified data flow equal to or smaller than the past CPU usage of the identified data flow, or in other words, the CPU usage that can resolve the bottleneck, and sets the number to the distribution number.

In this example, the past resource information 434 was used, but instead of using the past resource information 434, the dispatcher Hi may set a prescribed CPU usage as the threshold value to resolve a bottleneck, and set the distribution number by finding the number of data processing module DPiX that makes the CPU usage of the identified data flow equal to or small than the prescribed CPU usage. In this case, Step S903 is not necessary.

For the relevant data processing modules DPA, DPB, and DPD to DPF, the dispatcher Hi calculates the resource based on the following criteria (1) to (4).

(1) On the relevant data flow that includes a bottleneck (the data processing module DPC in this example), even after the bottleneck is resolved, if the flow volume of messages from the data processing module DPY preceding the bottleneck (the data processing module DPA in this example) to the data processing module DPC, the data processing module DPC might become a bottleneck again. Therefore, the dispatcher Hi increases the distribution number of the preceding data processing module PDY depending on the number of messages waiting in queue QY preceding the bottleneck. For example, if the number of waiting message does not reach the first threshold value that defines the bottle neck, but reaches the second threshold value lower than the first threshold value, the dispatcher Hi increases the distribution number of the preceding data processing module DPY. If the second threshold value has not been reached, the dispatcher Hi maintains the status quo. The dispatcher Hi may increase the distribution number more for a data processing module DPY that is closer to the bottleneck among the data processing modules DPY preceding the bottle neck.

(2) As for the data processing module DPY that follows the bottleneck (data processing modules DPD and DPF in this example) on the relevant data flows including the bottleneck, if the bottleneck is resolved, the volume of messages flowing into the subsequent data processing module DPY would increase. Therefore, the dispatcher Hi increases the distribution number of the data processing module PDY depending on the number of messages waiting in queue QY subsequent to the bottleneck. For example, if the number of waiting message does not reach the first threshold value that defines the bottleneck, but reaches the second threshold value lower than the first threshold value, the dispatcher Hi increases the distribution number of the data processing module DPY. If the second threshold value has not been reached, the dispatcher Hi maintains the status quo. The dispatcher Hi may increase the distribution number more for a data processing module DPY that is closer to the bottleneck among the data processing module DPY subsequent to the bottleneck.

(3) The dispatcher Hi may reduce the resource of the data processing module PDZ that has a relatively or absolutely lower process priority 604 among the data processing module DPY on other data flows than the relevant data flows (non-relevant data flows). The reduction number is set in advance. For example, the dispatcher Hi may reduce the distribution number of the data processing module DPZ using the process priority 604 such that the total distribution number of the server group SVs stays the same between before and after the flow volume control. However, the dispatcher Hi reduces the distribution number such that the reduction does not cause a bottleneck in the data processing module DPZ.

(4) Among the data processing modules DPY on the relevant data flows, there might be a data processing module DPZ that is a merging point with a non-relevant data flow (in this example, the data processing module PDF that also belongs to the non-relevant data flow "E→F"). If there is a difference greater than a prescribed number in the number of waiting messages between the queues QX (queues QC and QE in this example) of the data processing modules DPX (the data processing modules DPC and DPE in this example), the dispatcher Hi increases the distribution number of the data processing module DPX corresponding to the queue QX with a smaller number of messages. The increase number may be set in advance.

In this case, the dispatcher Hi may also increase the distribution number of the data processing module DPX with a smaller number to the same number as the distribution number of the data processing module DPX corresponding to the queue QX with a greater number of messages. For example, the data processing module DPF comes after the bottleneck data processing module DPC as well as the data processing module DPE that belongs to the non-relevant data flow "E→F." If the distribution number of the bottleneck data processing module DPC and the data processing module DPE is "6" and "2," respectively, and the prescribed number is "4," the difference between the distribution numbers is equal to the prescribed number. If the distribution number of the bottleneck data processing module DPC is increased from "6" to "8," the dispatcher Hi may also increase the distribution number of the data processing module DPE from "2" to "8."

Next, the dispatcher Hi determines the extensibility of a bottle neck (Step S905). The extensibility determination (Step S905) is a process to determine whether or not the extension is necessary for the bottleneck data processing module DPiX as well as whether the automatic extension is available or not for the bottleneck processing module DPiX. The dispatcher Hi makes judgment on the extensibility based on the calculation result of Step S904, the number of data processing module DPW not utilized in each server SVi, and the availability of the automatic extension of resources, which is defined in the resource requirement 604 of the data processing table 432.

If the calculation results show that the increased demand for resources increase can be made up for by the existing data processing module DPY, for example, the dispatcher Hi determines that the extension is not necessary (Step S905: Extension not necessary). However, if the resource requirement 603 of the data processing table 432 for the bottleneck data processing module DPiX is "automatic extension not available," the dispatcher Hi determines that automatic extension is not available (Step S905: Automatic Extension not available) If the resource requirement 603 of the data processing table 432 for the bottleneck data processing module DPiX is "automatic extension available," the dispatcher Hi determines that automatic extension is available (Step S905: Automatic extension available).

If the extension is not necessary (Step S905: Extension not necessary), the dispatcher Hi determines the distribution number and the flow volume control value, which are the flow volume control information 605 of the bottleneck data processing module DPiX and the relevant data processing module DPY, in accordance with the calculation result (Step S906). The dispatcher Hi increases or decreases the flow volume control value in accordance with the distribution number, for example. That is, the flow volume control value increases as the distribution number increases, and the flow volume control value decreases as the distribution number decreases. If the distribution number is "4" and the flow volume control value is "100 [msg/sec]," for example, the flow volume control value per data processing module is "25 [msg/sec]." Thus, if the distribution number increases from "4" to "5," the flow volume control value increases from "100 [msg/sec]" to "1.25 [msg/sec]." In a similar manner, if the distribution number decreases from "4" to "3," the flow volume control value decreases from "100 [msg/sec]" to "75 [msg/sec]."

If the automatic extension is not available (Step S905: Automatic Extension not available), the increased volume in the bottleneck data processing module DPiX needs to be made up for by the existing resource. Thus, the dispatcher Hi identifies a data processing module PDG that is not relevant to the data flow including the bottleneck data processing module DPiX, and reduces the resource allocated to the non-relevant data processing module DpiX (Step S907). Specifically, the dispatcher Hi reduces the distribution number and the flow volume control value of the data processing module DPZ with the flow volume current value 606 being relatively low among the non-relevant data processing module DPZ. If it is not possible to identify the data processing module PDZ to be controlled based on the flow volume current value 606, the dispatcher Hi may reduce the distribution number and the flow volume control value of the data processing module DPZ with the priority 501 being relatively low, among the non-relevant data processing module DPZ. The dispatcher Hi may alternatively use the process priority 604 instead of the priority 504.

If the automatic extension is available (Step S905: Automatic extension available), the dispatcher Hi or the operator extends the resource in coordination with the operating function (Step S908), and in a manner similar to Step S906, the dispatcher Hi determines the distribution number and the flow volume control value, which are the values of the flow volume control information 605 of the bottleneck data processing module DPiX and the relevant data processing module PDY (Step S909).

After Steps S906, S907, and S909, the dispatcher Hi reflects the distribution number and the flow volume control value determined through Steps S906, S907, and S909 into the flow volume control information 605, and updates the flow volume target value 505 of the data flow table 431 based on the updated flow volume control information 605 (Step S910).

The dispatcher Hi then increases or decreases the data processing module DPX based on the distribution number and the flow volume control value determined through Steps S906, S907, and S909 (Step S911).

Next, in order to provide feedback on the updated results of the flow volume control information 605, the dispatcher Hi determines whether the updated results are effective or not (Step S912). When the bottleneck data processing module DPX has been detected, the effectiveness of the results means whether or not the bottleneck can be resolved in the identified data flow, and when a data processing module DPX that is likely to be a bottleneck has been detected, the effectiveness of the results means whether or not the possible bottleneck can be resolved in the identified data flow.

When the bottleneck has been detected, specifically, the dispatcher Hi determines whether the updated results of the flow volume control information 605 are effective or not based on the flow volume current value 506 and the lower limit threshold value of the flow volume target value 505 of the data flow including the bottleneck data processing module DPiX, for example. The lower limit threshold value of the flow volume target value 505 is a threshold value that is an indicator of the bottleneck status. If the flow volume current value 506 is equal to or smaller than the lower limit threshold value, the updated results of the flow volume control information 605 are not effective, or in other words, a bottleneck has occurred in a queue QX on the data flow. The lower limit threshold value may be a fixed value, or a value determined based on the flow volume target value 505 updated in Step S910, an example of which is a third of the updated flow volume target value 505.

If the results are not effective (Step S912: No), the dispatcher Hi decreases the distribution number and the flow volume control value of the bottleneck data processing module DPiX by a prescribed amount (Step 3), and updates the flow volume control information 605 of the data processing table 432. The prescribed amount is the flow volume control value per data processing module described above (will be referred to as a one-level control amount below), and in the example described above, the distribution number is decreased by 1, and the flow volume control value is decreased by 25 [msg/sec], for example. The dispatcher Hi may decrease the value by two or more levels of the control amount, or restore all of the distribution numbers and flow volume control values that have been increased or decreased to the original values.

If the results are effective (Step S912: Yes), the dispatcher Hi increases the distribution number and the flow volume control value by a prescribed amount (one level of the control value, for example), and updates the flow volume control information 605 of the data processing table 432. The dispatcher Hi may decrease two or more levels of the control amount.

After Steps S913 or S914, the dispatcher Hi reflects the distribution number and the flow volume control value revised in Step S913 or S914 into the flow volume control information 605, and updates the flow volume target value 505 of the data flow table 431 based on the updated flow volume control information 605 (Step S915).

The dispatcher Hi then increases or decreases the data processing module DPX based on the distribution number and the flow volume control value revised in Step S913 or S914 (Step S916). In FIG. 9, the increase or decrease of the data processing module DPX was described separately for Step S911 and Step S916, but the data processing module DPX may be increased or decreased collectively in Step S916.

Figure 10:
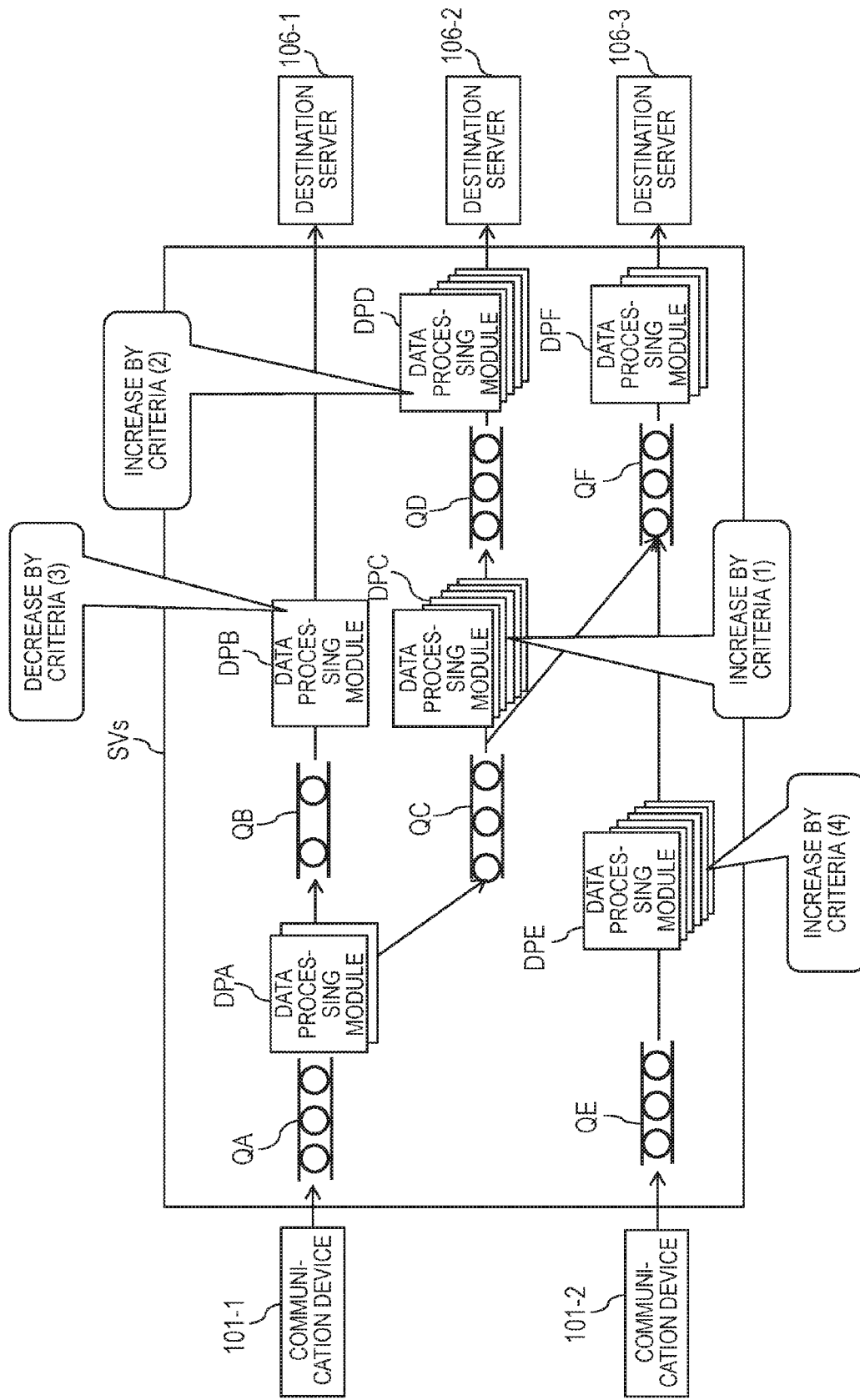
FIG. 10 is a diagram for explaining an example of a data flow after flow volume control.

FIG. 10 is a diagram for explaining an example of a data flow after flow volume control. FIG. 10 shows an example in which the numbers of the bottleneck data processing module DPiX and other data processing modules DPY have increased or decreased by applying the criteria (1) to (4) described above. After this flow volume control, the dispatcher Hi conducts the flow volume control determination (Step S804) shown in FIG. 8.

As described above, in the data processing system of this embodiment, the data processing module that is a bottleneck or is likely to be a bottleneck is increased such that the message processing capacity of the data processing module increases, and the amount of waiting messages in a queue can be indirectly reduced. With this configuration, the data processing system of this embodiment can resolve a bottleneck that has occurred or is likely to occur in the data flow group including a plurality of different types of data processing, and as a result, the through-put of the data flow group can be improved.

By increasing the number of the data processing module that is relevant to a bottleneck, the through-put of the data flow group can be improved more efficiently. By decreasing the number of the data processing module that is not relevant to a bottleneck, the freed-up resource can be used for the data processing module needing extra resources.

As described above, with this embodiment, it is possible to scale up or scale down the processing capability of the data processing system that conducts complex data processing involving a plurality of different types of data processing, and as a result, the efforts required for the load distribution design and tuning by the operator can be reduced, which can speed up the development stage.

It should be noted that this invention is not limited to the above-mentioned embodiments, and encompasses various modification examples and the equivalent configurations within the scope of the appended claims without departing from the gist of this invention. For example, the abovementioned embodiments are described in detail for a better understanding of this invention, and this invention is not necessarily limited to what includes all the configurations that have been described. Further, a part of the configurations according to a given embodiment may be replaced by the configurations according to another embodiment. Further, the configurations according to another embodiment may be added to the configurations according to a given embodiment. Further, a part of the configurations according to each embodiment may be added to, deleted from, or replaced by another configuration.

Further, a part or entirety of the respective configurations, functions, processing modules, processing means, and the like that have been described may be implemented by hardware, for example, may be designed as an integrated circuit, or may be implemented by software by a processor interpreting and executing programs for implementing the respective functions.

The information on the programs, tables, files, and the like for implementing the respective functions can be stored in a storage device such as a memory, a hard disk drive, or a solid state drive (SSD) or a recording medium such as an IC card, an SD card, or a DVD.

Further, control lines and information lines that are assumed to be necessary for the sake of description are described, but not all the control lines and information lines that are necessary in terms of implementation are described. It may be considered that almost all the components are connected to one another in actuality.

What is claimed is:

1. A data processing system configured to conduct data processing on a message from an sender and send the message to a destination, comprising:
   a computer-readable storage medium; and
   at least one processor for executing stored instructions to:
      via at least one each of a plurality of types of data processing module, conduct different types of the data processing;
      through a plurality of data flows, conduct a series of different types of data processing on the message and the message that was subjected to the series of different types of data processing and is sent to the destination; and
      via a dispatcher, distribute the message and a message that was subjected to the data processing by the data processing module to a subsequent data processing module,
   wherein the dispatcher conducts:
      a detection process to detect a specific data processing module in a specific status of being a bottleneck or being likely to be a bottleneck based on an amount of waiting messages;
      a determining process to determine a number of the specific data processing module detected in the detection process so as to resolve the specific status by increasing a number of the specific data processing module; and
      a setting process to set the number of the specific data processing module to the number that was determined in the determining process so as to resolve the specific status.

2. A data processing system configured to conduct data processing on a message from an sender and send the message to a destination, comprising:
   a computer-readable storage medium; and
   at least one processor for executing stored instructions to:
      via at least one each of a plurality of types of data processing module, conduct different types of the data processing;
      through a plurality of data flows, conduct a series of different types of data processing on the message and the message that was subjected to the series of different types of data processing and is sent to the destination; and
      via a dispatcher, distribute the message and a message that was subjected to the data processing by the data processing module to a subsequent data processing module,
   wherein the dispatcher conducts:
      a detection process to detect a specific data processing module in a specific status of being a bottleneck or being likely to be a bottleneck;
      a determining process to determine a number of the specific data processing module detected in the detection process so as to resolve the specific status by increasing a number of the specific data processing module; and
      a setting process to set the number of the specific data processing module to the number that was determined in the determining process so as to resolve the specific status, wherein, in the determining process, the dispatcher determines a number of other data processing modules than the specific data processing module so as to be greater than a number of the other data processing modules prior to the specific status in a relevant data flow that includes the specific data processing module among the plurality of data flows, and wherein, in the setting process, the dispatcher sets the number of the other data processing modules so as to be greater than the number of the other data processing modules prior to the specific status.

3. A data processing system configured to conduct data processing on a message from an sender and send the message to a destination, comprising:
   a computer-readable storage medium; and
   at least one processor for executing stored instructions to:
      via at least one each of a plurality of types of data processing module, conduct different types of the data processing;
      through a plurality of data flows, conduct a series of different types of data processing on the message and the message that was subjected to the series of different types of data processing and is sent to the destination; and
      via a dispatcher, distribute the message and a message that was subjected to the data processing by the data processing module to a subsequent data processing module,
   wherein the dispatcher conducts:
      a detection process to detect a specific data processing module in a specific status of being a bottleneck or being likely to be a bottleneck;
      a determining process to determine a number of the specific data processing module detected in the detection process so as to resolve the specific status by increasing a number of the specific data processing module; and
      a setting process to set the number of the specific data processing module to the number that was determined in the determining process so as to resolve the specific status,
   wherein, in the determining process, the dispatcher determines a number of other data processing modules than the specific data processing module so as to be smaller than a number of the other data processing modules prior to the specific status in a non-relevant data flow that is different from a relevant data flow that includes the specific data processing module among the plurality of data flows, and
   wherein, in the setting process, the dispatcher sets the number of the other data processing modules so as to be smaller than the number of the other data processing modules prior to the specific status.

4. A data processing system configured to conduct data processing on a message from an sender and send the message to a destination, comprising:
   a computer-readable storage medium; and
   at least one processor for executing stored instructions to:
      via at least one each of a plurality of types of data processing module, conduct different types of the data processing;
      through a plurality of data flows, conduct a series of different types of data processing on the message and the message that was subjected to the series of different types of data processing and is sent to the destination; and
      via a dispatcher, distribute the message and a message that was subjected to the data processing by the data processing module to a subsequent data processing module,
   wherein the dispatcher conducts:
      a detection process to detect a specific data processing module in a specific status of being a bottleneck or being likely to be a bottleneck;
      a determining process to determine a number of the specific data processing module detected in the detection process so as to resolve the specific status by increasing a number of the specific data processing module; and
      a setting process to set the number of the specific data processing module to the number that was determined in the determining process so as to resolve the specific status,
   wherein, in the determining process, the dispatcher determines a number of other data processing modules than the specific data processing module so as to be greater than a number of the other data processing modules prior to the specific status in a relevant data flow that includes the specific data processing module among the plurality of data flows,
   wherein, in the setting process, the dispatcher sets the number of the other data processing modules so as to be greater than the number of the other data processing modules prior to the specific status, and
   wherein, in the determining process, the dispatcher determines a number of the other data processing modules based on a priority level of the other data processing modules.

5. A data processing system configured to conduct data processing on a message from an sender and send the message to a destination, comprising:
   a computer-readable storage medium; and
   at least one processor for executing stored instructions to:
      via at least one each of a plurality of types of data processing module, conduct different types of the data processing;
      through a plurality of data flows, conduct a series of different types of data processing on the message and the message that was subjected to the series of different types of data processing and is sent to the destination; and
      via a dispatcher, distribute the message and a message that was subjected to the data processing by the data processing module to a subsequent data processing module,
   wherein the dispatcher conducts:
      a detection process to detect a specific data processing module in a specific status of being a bottleneck or being likely to be a bottleneck;
      a determining process to determine a number of the specific data processing module detected in the detection process so as to resolve the specific status by increasing a number of the specific data processing module; and
      a setting process to set the number of the specific data processing module to the number that was determined in the determining process so as to resolve the specific status,
   wherein, in the determining process, if there is a data processing module where a non-relevant data flow that is different from a relevant data flow including the specific data processing module merges with the relevant data flow among the plurality of data flow, the dispatcher determines a number of data processing module preceding the data processing module that is a merging point of the data flows so as to be greater than a number of the data processing module prior to the specific status on the non-relevant data flow, and wherein, in the setting process, the dispatcher sets a number of the preceding data processing module so as to be greater than a number of the preceding data processing module prior to the specific status.

6. A data processing system configured to conduct data processing on a message from an sender and send the message to a destination, comprising:

a computer-readable storage medium; and at least one processor for executing stored instructions to:

via at least one each of a plurality of types of data processing module, conduct different types of the data processing;

through a plurality of data flows, conduct a series of different types of data processing on the message and the message that was subjected to the series of different types of data processing and is sent to the destination; and via a dispatcher, distribute the message and a message that was subjected to the data processing by the data processing module to a subsequent data processing module, wherein the dispatcher conducts:

a detection process to detect a specific data processing module in a specific status of being a bottleneck or being likely to be a bottleneck;

a determining process to determine a number of the specific data processing module detected in the detection process so as to resolve the specific status by increasing a number of the specific data processing module; and a setting process to set the number of the specific data processing module to the number that was determined in the determining process so as to resolve the specific status, and wherein, in the determining process, the dispatcher determines a number of the data processing module so as not to exceed a maximum number of the data processing module that is available for each type.

7. A data processing system configured to conduct data processing on a message from an sender and send the message to a destination, comprising:

a computer-readable storage medium; and at least one processor for executing stored instructions to:

via at least one each of a plurality of types of data processing module, conduct different types of the data processing;

through a plurality of data flows, conduct a series of different types of data processing on the message and the message that was subjected to the series of different types of data processing and is sent to the destination; and via a dispatcher, distribute the message and a message that was subjected to the data processing by the data processing module to a subsequent data processing module, wherein the dispatcher conducts:

a detection process to detect a specific data processing module in a specific status of being a bottleneck or being likely to be a bottleneck;

a determining process to determine a number of the specific data processing module detected in the detection process so as to resolve the specific status by increasing a number of the specific data processing module; and a setting process to set the number of the specific data processing module to the number that was determined in the determining process so as to resolve the specific status, wherein, in the determining process, the dispatcher determines a flow volume control value in accordance with a number of data processing module that can resolve the specific status, the flow volume control value being a target value that allows a message subjected to data processing in the specific data processing module to be sent to a subsequent data processing module that conducts the following data processing on a relevant data flow that includes the specific data processing module among the plurality of data flows, and wherein the dispatcher conducts:

a flow volume control determining process to determine whether or not a flow volume current value representing a current message flow volume of the specific data processing module is equal to or greater than the flow volume control value determined in the determining process; and a distribution process to distribute a message subjected to data processing by the specific data processing module to the subsequent data processing module, if the flow volume current value is equal to or greater than the flow volume control value.

8. A data processing system configured to conduct data processing on a message from an sender and send the message to a destination, comprising:

a computer-readable storage medium; and at least one processor for executing stored instructions to:

via at least one each of a plurality of types of data processing module, conduct different types of the data processing;

through a plurality of data flows, conduct a series of different types of data processing on the message and the message that was subjected to the series of different types of data processing and is sent to the destination; and via a dispatcher, distribute the message and a message that was subjected to the data processing by the data processing module to a subsequent data processing module, wherein the dispatcher conducts:

a detection process to detect a specific data processing module in a specific status of being a bottleneck or being likely to be a bottleneck;

a determining process to determine a number of the specific data processing module detected in the detection process so as to resolve the specific status by increasing a number of the specific data processing module; and a setting process to set the number of the specific data processing module to the number that was determined in the determining process so as to resolve the specific status, wherein, in the determining process, the dispatcher determines a flow volume control value in accordance with a number of data processing module that can resolve the specific status, the flow volume control value being a target value that allows a message subjected to data processing in the specific data processing module to be sent to a subsequent data processing module that conducts the following data processing on a relevant data flow that includes the specific data processing module among the plurality of data flows, wherein the dispatcher conducts:

a flow volume control determining process to determine whether or not a flow volume current value representing a current message flow volume of the specific data processing module is equal to or greater than the flow volume control value determined in the determining process; and a distribution process to distribute a message subjected to data processing by the specific data processing module to the subsequent data processing module, if the flow volume current value is equal to or greater than the flow volume control value, and wherein the dispatcher conducts:

a effectiveness determining process to determine whether the specific status is resolved or not in the data flow, based on the flow volume current value and a flow volume target value, the flow volume current value representing a current message flow volume in the specific data flow, the flow volume target value corresponding to the flow volume control value determined in the determining process; and an increase and decrease control process to increase or decrease a number of data processing module and the flow volume control value determined in the determining process, based on the results of the effectiveness determining process.

9. A data processing method for a data processing system configured to conduct data processing on a message from a sender and send the message to a destination, wherein the data processing system comprises:

a computer-readable storage medium; and at least one processor for executing stored instructions to:

via at least one each of a plurality of types of data processing module, conduct different types of the data processing;

through a plurality of data flows, conduct a series of different types of data processing on the message and the message that was subjected to the series of different types of data processing and is sent to the destination; and via a dispatcher, distribute the message and a message that was subjected to the data processing by the data processing module to a subsequent data processing module, wherein the dispatcher conducts:

a detection process to detect a specific data processing module in a specific status of being a bottleneck or being likely to be a bottleneck based on an amount of waiting messages;

a determining process to determine a number of the data processing modules detected in the detection process so as to resolve the specific status by increasing a number of the specific data processing module; and a setting process to set the number of the specific data processing module to the number determined in the determining process so as to resolve the specific status.

* * * * *